United States Patent [19]

Kalinowski et al.

[11] Patent Number: 5,145,907

[45] Date of Patent: * Sep. 8, 1992

[54] PRECURED SILICONE EMULSION

[75] Inventors: Robert E. Kalinowski, Auburn; Donald T. Liles, Midland; Nick E. Shephard, Rhodes, all of Mich.

[73] Assignee: Dow Corning Corporation, Midland, Mich.

[*] Notice: The portion of the term of this patent subsequent to Sep. 4, 2007 has been disclaimed.

[21] Appl. No.: 576,570

[22] Filed: Aug. 31, 1990

Related U.S. Application Data

[63] Continuation-in-part of Ser. No. 411,800, Sep. 25, 1989.

[51] Int. Cl.$^5$ .................................................. C08K 3/36
[52] U.S. Cl. ................................. 524/789; 524/588; 524/837; 528/18
[58] Field of Search ................ 524/789, 588, 837; 528/18

[56] References Cited

U.S. PATENT DOCUMENTS

| | | | |
|---|---|---|---|
| 2,891,920 | 3/1959 | Hyde et al. | 260/29.2 |
| 3,294,725 | 7/1966 | Findlay et al. | 260/29.2 |
| 3,355,406 | 11/1967 | Cekada | 260/29.2 |
| 4,100,124 | 7/1978 | Ichikawa et al. | 260/29.2 |
| 4,146,499 | 3/1979 | Rosano | 252/186 |
| 4,177,177 | 12/1979 | Vanderhoff et al. | 260/29.2 |
| 4,221,688 | 9/1980 | Johnson et al. | 260/29.2 M |
| 4,427,811 | 1/1984 | Elias et al. | 524/96 |
| 4,590,220 | 5/1986 | Bauman et al. | 524/789 |
| 4,618,642 | 10/1986 | Schoenherr | 524/425 |
| 4,620,878 | 11/1986 | Gee | 106/287.15 |
| 4,720,530 | 1/1988 | Würminghausen et al. | 524/588 |
| 4,954,565 | 9/1990 | Liles | 524/860 |
| 4,957,963 | 9/1990 | Burns et al. | 524/588 |
| 4,962,153 | 10/1990 | Liles | 524/837 |

*Primary Examiner*—Melvyn I. Marquis
*Assistant Examiner*—Karen A. Hellender
*Attorney, Agent, or Firm*—Edward C. Elliott

[57] ABSTRACT

A shelf stable aqueous silicone emulsion which yields an elastomer upon removal of the water is produced by combining a reactive polydiorganosiloxane present as a cationic or nonionic emulsion of dispersed particles in water, a crosslinker, and a tin catalyst, the tin catalyst being in the form of a divalent tin atom combined with organic radicals. The emulsion can be reinforced with colloidal silica without effecting the shelf life of the reinforced emulsion.

24 Claims, No Drawings

PRECURED SILICONE EMULSION

This is a continuation-in-part of copending application(s) Ser. No. 07/411,800 filed on Sep. 25, 1989.

BACKGROUND OF THE INVENTION

1. Field of the Invention

This invention relates to an aqueous silicone emulsion which gives a silicone elastomer upon removal of the water under ambient conditions.

2. Background Information

A silicone rubber latex reinforced with silsesquioxane is taught in U.S. Pat. No. 3,355,406, issued Nov. 28, 1967, by Cekada. He teaches a latex containing a curable, essentially linear silicone polymer, preferably a hydroxy or alkoxy endblocked linear polymer having been prepared by emulsion polymerization, a crosslinking agent which is a trifunctional or tetrafunctional silane, preferably trialkoxysilane, and a catalyst. Included in the catalysts are dialkyltindiacylates.

Ichikawa, et al. describe silicone compositions which are useful as binders for fibrous gasketing and packing materials in U.S. Pat. No. 4,100,124, issued Jul. 11, 1978. The compositions are a mixture of hydroxyl endblocked diorganosiloxanes, a crosslinking trialkoxysilane, catalyst, emulsifier, and water.

Johnson et al. describe in U.S. Pat. No. 4,221,688, issued Sep. 9, 1980, a silicone emulsion which provides an elastomeric product and methods for its preparation. The emulsion comprises a continuous aqueous phase and a dispersed phase, the dispersed phase consisting essentially of an anionically stabilized hydroxylated polydiorganosiloxane which contains about 2 silicon-bonded hydroxyls per molecule, an organic tin compound, and a colloidal silica, the emulsion having a pH in the range of 9 to 11.5 inclusive. Experience with such emulsions has now shown that there is a problem with the shelf life of the emulsion, which is manifested by a change in properties of the elastomer obtained upon drying as the emulsion ages; and, in addition, a change in properties upon aging of the elastomer produced by the removal of water from the emulsion.

A silicone elastomeric emulsion having improved shelf life is taught by Elias and Freiberg in U.S. Pat. No. 4,427,811, issued Jan. 24, 1984. The emulsion is produced by a method which first mixes an anionically stabilized, hydroxyl endblocked polydiorganosiloxane, colloidal silica, and an alkyl tin salt, then ages the mixture for at least two weeks at room temperature, then adds filler other than colloidal silica. The alkyl tin salt is preferably a dialkyltindicarboxylate.

A different type of aqueous emulsion is taught in U.S. Pat. No. 4,618,642, issued Oct. 21, 1986, by Schoenherr. This composition consists essentially of an anionically stabilized, hydroxyl endblocked polydiorganosiloxane, a dialkyltindicarboxylate, a trifunctional silane crosslinking agent, and a non-siliceous, inert filler. The filler is non-siliceous since the shelf life will be affected if a silica filler is present because the composition still contains the hydroxylated polydiorganosiloxane and organic tin compound as found in Johnson et al.

SUMMARY OF THE INVENTION

This invention encompasses a process for producing an aqueous silicone emulsion which gives an elastomer upon removal of the water which can be reinforced with a silica filler and still retain its properties upon aging, the shelf stable aqueous silicone emulsion resulting from the process, and the elastomer produced by removal of the water from the emulsion. The process combines an ionically or nonionically stabilized polydiorganosiloxane emulsion, the polydiorganosiloxane having at least two reactive groups per molecule; a stoichiometric amount of crosslinker when the polydiorganosiloxane has only 2 reactive groups per molecule; and a tin (II) catalyst, such as stannous octoate. The emulsion can be reinforced with colloidal silica, without loss of shelf life. The use of the divalent tin (II) as catalyst is a crucial part of the invention.

DESCRIPTION OF THE INVENTION

This invention relates to an aqueous silicone emulsion of a polydiorganosiloxane in which emulsion a tin catalyst is used to accelerate the reaction of the reactive groups used to form or crosslink the polydiorganosiloxane and a crosslinker, wherein the improvement comprises the use of a tin (II) compound as the catalyst.

This invention relates to an aqueous silicone emulsion stabilized cationically or nonionically or by a combination of both which yields an elastomer upon removal of the water comprising (1) 100 parts by weight of cationically or nonionically stabilized polydiorganosiloxane emulsion, the polydiorganosiloxane having at least two reactive groups per molecule, the organo radicals being monovalent hydrocarbon radicals containing less than 7 carbon atoms per radical or 2-(perfluoroalkyl)ethyl raidcals having less than 7 carbon atoms per radical, the reactive groups selected from the atoms or radicals consisting of (a) hydrogen, (b) OR, where R is hydrogen, monovalent hydrocarbon radical or substituted hydrocarbon radical having less than 7 carbon atoms, functionalized hydrocarbon radicals, nitrogen compounds of the formula $-N=CR'_2$ or $-NR'COR'$ or $-NR'_2$, where R' is either hydrogen or monovalent hydrocarbon radicals having less than 7 carbon atoms, (c) groups of the formula $-NR_2$ or $-NCOR$ where R is as defined above, and (d) halogen, (2) from 0.1 to 10 parts by weight of tin (II) catalyst, and, when (1) has only 2 reactive groups per molecule, (3) sufficient crosslinker on a stoichiometric basis selected from the group consisting of (e) silane of the formula $R_xSiY_{4-x}$ where Y is selected from the group consisting of hydrogen, halogen, and OR', and R and R' are as defined above, and x is either 0 or 1; and (f) silazane of the formula $R_xSi(NR'_2)_{4-x}$, where R, R' and x are as defined above; the emulsion being able to be filled with either reinforcing or extending fillers or pigments or combinations thereof, the emulsion yielding an elastomer upon evaporation of the water.

This invention relates to a process for producing an aqueous silicone emulsion stabilized cationically or nonionically or by a combination of both which yields an elastomer upon removal of the water comprising (A) mixing (1) 100 parts by weight of cationically or nonionically stabilized polydiorganosiloxane emulsion, the polydiorganosiloxane having at least two reactive groups per molecule, the organo radicals being monovalent hydrocarbon radicals containing less than 7 carbon atoms per radical or 2-(perfluoroalkyl)ethyl radicals having less than 7 carbon atoms per radical, the reactive groups selected from the atoms or radicals consisting of (a) hydrogen, (b) OR, where R is hydrogen, monovalent hydrocarbon radical or substituted hydrocarbon radical having less than 7 carbon atoms, functionalized hydrocarbon radicals, nitrogen compounds of the formula $-N=CR'_2$ or $-NR'COR'$ or $-NR'_2$, where R' is either hydrogen or monovalent hydrocarbon radicals having less than 7 carbon atoms, (c) groups of the formula $-NR_2$ or $-NCOR$ where R is as defined above, and (d) halogen; (2) from 0.1 to 10 parts by weight of tin (II) catalyst; and when (1) has only 2 reactive groups per molecule; (3) sufficient crosslinker on a stoichometric basis selected from the group consisting of (e) silane of the formula $R_xSiY_{4-x}$ where Y is selected from the group consisting of hydrogen, halogen, and OR', and R and R' are as defined above, and x is either 0 or 1; and (f) silazane of the formula $R_xSi(NR'_2)_{4-x}$, where R, R' and x are as defined above; then (B) aging at room temperature for sufficient time to allow crosslinking of the polydiorganosiloxane, to give an emulsion being able to be filled with either reinforcing or extending fillers or pigments or combinations thereof, the emulsion yielding an elastomer upon evaporation of the water.

Hydroxyl endblocked polydiorganosiloxane in emulsion form can be crosslinked to form what is known in the art as pre-crosslinked or precured silicone emulsions. Removal of water from these precured emulsions produces silicone elastomers. The precured silicone elastomer emulsions described by Johnson et al. in U.S. Pat. No. 4,221,688, are of this type. The useful life (shelf life) of the emulsions of Johnson et al. is limited due to a reaction of the hydroxyl endblocked polydiorganosiloxane and the silica filler in the presence of tetrafunctional tin catalyst. This invention encompasses a process for producing an aqueous silicone emulsion that is precured, but has improved shelf life. Crosslinking is accomplished in the emulsion by reaction of the reactive groups of the polydiorganosiloxane (1) and the crosslinker (3), if used, in the presence of a divalent tin (tin (II)) catalyst.

The cationically or nonionically stabilized polydiorganosiloxane emulsion used in this invention is now well known in the art. The polydiorganosiloxane is one which can be emulsified, and when crosslinked imparts elastomeric properties to the product obtained after the removal of the water from the emulsion Tensile strengths and elongations at break improve with increasing weight average molecular weight (Mw). The maximum weight average molecular weight is one which can be emulsified and which will give elastomeric properties to the product obtained after the water is removed from the emulsion. Weight average molecular weights up to about 1,000,000 for the hydroxyl endblocked polydiorganosiloxane are expected to be practical for this invention. The preferred Mw for the hydroxyl endblocked polydiorganosiloxanes are in the range of 200,000 to 700,000. The organo radicals of the polydiorganosiloxane can be monovalent hydrocarbon radicals containing less than seven carbon atoms per radical and 2-(per-fluoroalkyl)ethyl radicals having less than 7 carbon atoms per radical, including 3,3,3-trifluoropropyl and 2-(perfluorobutyl)ethyl. The polydiorganosiloxanes preferably contain organic radicals in which at least 50 percent are methyl. The polydiorganosiloxanes can be linear or branched polymers containing two or more organic groups per silicon atom. A preferred anionically stabilized, hydroxyl endblocked polydiorganosiloxane is that prepared by the method of anionic emulsion polymerization described by Findlay et al. in U.S. Pat. No. 3,294,725, issued Dec. 27, 1966, which is hereby incorporated by reference to show the methods of polymerization, the ingredients used, and the hydroxyl endblocked polydiorganosiloxane obtained in an emulsion. Another method of preparing the anionically stabilized, hydroxyl endblocked polydiorganosiloxane is described by Hyde et al. in U.S. Pat. No. 2,891,920, issued Jun. 23, 1959, which is hereby incorporated by reference to show the hydroxyl endblocked polydiorganosiloxanes, the ingredients used, and their method of preparation. Other methods of preparing polydiorganosiloxane emulsions which are suitable for use in this invention include the methods described in U.S. Pat. Nos. 4,146,499, issued Mar. 27, 1979; 4,177,177, issued Dec. 4, 1979; 4,620,878, issued Nov. 4, 1986; all of which hereby incorporated by reference to show polydiorganosiloxane emulsions and how to prepare them.

The shelf stability of the aqueous silicone emulsion of this invention is the result of the use of divalent tin as the tin catalyst, rather than the tetravalent tin which has been used in the past in aqueous silicone emulsions of this type. The divalent, stannous form of tin does not cause a reaction between the reactive groups of the polydiorganosiloxane and silica as is caused when the tetravalent, stannic form of tin is used as the catalyst. Therefore, when stannous catalyst is combined with reactive polydiorganosiloxane and the crosslinker of this invention, crosslinking occurs readily; and the crosslinked polymer in emulsion can be reinforced with silica without a loss of shelf life. It is desirable that the tin (II) (stannous) catalyst be compatible in the polymer. The tin (II) (stannous) catalyst used in this invention can be any of the organic stannous carboxylates, such as stannous oleate, stannous neodecanoate, or stannous octoate. The preferred stannous catalyst is stannous octoate (stannous bis(2-ethylhexanoate)).

When the polydiorganosiloxane in the emulsion of this invention has only two reactive groups, it is crosslinked by the use of a crosslinker selected from the group consisting of (e) silane of the formula $R_xSiY_{4-x}$ where Y is selected from the group consisting of hydrogen, halogen, and OR', and R and R' are as defined above, and x is either 0 or 1; and (f) silazane of the formula $R_xSi(NR'_2)_{4-x}$, where R, R' and x are as defined above.

If the polydiorganosiloxane and the crosslinker are not mixed before emulsification, the crosslinker must be capable of migrating from the aqueous phase into the emulsion micelle of (1). Whether or not crosslinkers will adaquately perform in the process of this invention is determined experimentally. Crosslinker and tin (II) catalyst are added with stirring to a sample of the reactive polydiorganosiloxane emulsion and the mixture in allowed to remain undisturbed for 24 hours to complete the crosslinking process. Usually 1 percent crosslinker and 0.5 percent tin (II) catalyst (based upon polymer weight) are sufficient. After crosslinking, films of the emulsion are cast, and after drying, they are examined. If the films are tack free and elastomeric, the crosslinker is suitable; but if they are non-elastic, the crosslinker is unsuitable. If they are slightly elastomeric and tacky, crosslinking occured to some extent, the crosslinker may be suitable if more is used. For example, silanes of the formula $(CH_3O)_3SiCH_2CH_2NH_2$ or $(CH_3O)_3Si(CH_2)_3NH(CH_2)_2NH_2$ did not function when used with a hydroxyl endblocked polydimethylsiloxane emulsion due to the fact that they remained in the aqueous phase when added to the emulsion and did not migrate into the micelle so that the reaction with the hydroxyl endblocked polymer could take place. Other crosslinkers which were found unsuitable included $(CH_3O)_3Si(CH_2)_2C_6H_4SO_2N_3$ and $(CH_3CH_2O)_3Si(CH_2)_3N=C=O$. A silane of the formula $(CH_3O)_3SiCH_2CH_2NHC_6H_5$ did provide a crosslinked emulsion polymer since this silane does migrate into the micelle.

R can be hydrogen; a monovalent hydrocarbon radical or substituted hydrocarbon radical such as an alkyl radical, for example methyl, ethyl, propyl, isopropyl, and butyl, an alkenyl radical such as vinyl or allyl, a halogenated hydrocarbon such as chloropropyl or trifluoropropyl, an aryl radical such as phenyl, functionalized hydrocarbon radicals such as glycidoxy, acryl or methacryl, and mercapto, and amine containing radicals such as phenylaminopropyl but not aminopropyl or aminoethylaminopropyl for the reasons given above. R' is chosen from methyl, ethyl, propyl, isopropyl, and butyl. Suitable silanes include ethylorthosilicate, normal propylorthosilicate, mercaptopropyltrimethoxysilane, methyltrimethoxysilane, phenyltrimethoxysilane, chloropropyltrimethoxysilane, trifluoropropyltrimethoxysilane, ethyltrimethoxysilane, triethoxysilane, and vinyltrimethoxysilane. Preferred silanes are vinyltrimethoxysilane and normal propylorthosilicate.

The crosslinker can also be a ketoxime functional silane where the functional radical is of the formula $-O-N=CR''_2$, where R'' is hydrogen or monovalent hydrocarbon radical of from 1 to 7 carbon atoms inclusive. Examples of such silanes include methyltris(methylethylketoxime)silane, methyltris(dimethylketoxime)silane, methyltris(diethylketoxime)silane, and vinyltris(methylethylketoxime)silane. A preferred ketoximo silane is methyltris(methylethylketoxime)silane.

The crosslinker can also be (f) silazane of the formula $R_xSi(NR'_2)_{4-x}$, where R is hydrogen, monovalent hydrocarbon radical or substituted hydrocarbon radical having less than 7 carbon atoms, functionalized hydrocarbon radicals, nitrogen compounds of the formula $-N=CR'_2$ or $-NR'COR'$ or $-NR'_2$, where R' is either hydrogen or monovalent hydrocarbon radicals having less than 7 carbon atoms and x is either 0, 1.

When the polydiorganosiloxane of (1) has an average of more than 2 reactive groups per molecule, it is not necessary to have crosslinker (3) present in order to form a crosslinked polymer. The reactive groups on the different polydiorganosiloxane molecules can react with each other to form the required crosslinks. The polydiorganosiloxane (1) can be a mixture of different kinds of molecules, for example long chain linear molecules and short chain linear or branched molecules. These molecules react with each other to form a crosslinked network. Such polydiorganosiloxanes which can take the place of more conventional crosslinkers are illustrated by low molecular weight organosilicon hydrides such as polymethylhydrogensiloxane, low molecular weight copolymers containing methylhydrogensiloxy and dimethylsiloxy groups, $-(OSi(OEt)_2)-$, (ethylpolysilicate), $(OSiMeC_2H_4Si(OMe)_3)_4$, and $(OSiMeON=CR''_2)_4$, where Me is methyl radical and Et is ethyl radical. Silicon compounds other than siloxanes having at least 3 reactive groups per molecule, such as $(MeO)_3SiC_2H_4Si(OMe)_3$ are also suitable, as long as they move from the aqueous phase into the micelle so that they can react with the polymer. It is believed that the non-reactive radicals in the siloxane can be any group as long as it does not inhibit the migration of the siloxane crosslinker into the micelle.

The crosslinked emulsion produced by the method of claim 1 can be reinforced and/or extended through the addition of filler. Any of the common fillers which do not react with the emulsion are suitable. Inert fillers suitable for use in anionic silicone emulsions are well known. The fillers have an average particle size below 10 micrometers, preferably below 2 micrometers. Examples of fillers include carbon blacks, titanium dioxide, aluminum oxide, calcium carbonate, zinc oxide, mica, and various pigments. Titanium oxide has been found to be particularly useful as an ultraviolet light screening agent. The crosslinked emulsion of this invention is particularly useful because it can be reinforced with colloidal silica. Although the common fumed silica can be used as reinforcement, preferred is a colloidal silica dispersion. There are commercially available aqueous dispersions of fumed colloidal silica. A preferred silica dispersion is a sol of colloidal silica such as the commercially available Nalcoag ® silicas from Nalco Chemical Company.

The process of this invention begins by mixing the emulsion of reactive polydiorganosiloxane (1), tin (II) catalyst (2), and crosslinker (3), if used. If the polydiorganosiloxane (1) has greater than 2 reactive groups per molecule, a polydiorganosiloxane endblocked with trialkoxysilyl groups for example, a crosslinker is not necessary to form a crosslinked elasotomer. A crosslinker can be used if desired, even when not necessary. For each 100 parts by weight of hydroxyl endblocked polydiorganosiloxane, there is from 0.1 to 1.0 parts by weight of tin (II) catalyst. The amount of tin catalyst used has an effect upon how long it takes for the polydiorganosiloxane in the emulsion to react to provide a crosslinked polymer within the emulsion micelles. A preferred amount of tin (II) catalyst is from 0.25 to 1.0 parts by weight. The crosslinker, when used is present in an amount from 0.1 to 5 parts by weight. The rate of crosslinking and the modulus of the crosslinked elastomer formed by drying the emulsion can be varied by varying the number of reactive groups present and the molecular weight of the polydiorganosiloxane, as well as the amount of crosslinker used. As more crosslinker is used, the modulus is raised. It is not necessary to add more crosslinker than is required to react with the reactive groups present on the polydiorganosiloxane. A preferred amount of crosslinker is from 0.5 to 2 parts by weight. When the crosslinker is a tetrafunctional material, x is 0, while x is 1 for a trifunctional crosslinker. During the process of mixing, preferably, the tin (II) catalyst is added to the emulsion of polydiorganosiloxane first, followed by the crosslinker. The order of mixing is not critical as the crosslinker can be added first, followed by the catalyst, or the crosslinker and catalyst can be mixed together and then added to the polydiorganosiloxane emulsion. As soon as the ingredients are mixed, the reaction between the reactive polydiorganosiloxane and the crosslinker will begin, resulting in the production of crosslinked polymer. The reaction is allowed to proceed until the emulsion gives an elastomer upon removal of the water. This point can be monitored by simply testing a portion of the mixture during the crosslinking process. If the crosslinked emulsion is then allowed to shelf age, the catalyst will gradually become inactive, due to hydrolysis.

At this point in the process, the emulsion can be used to give a coating of a crosslinked polydiorganosiloxane. Such an emulsion could be used for the treatment of paper or fabrics; for example, by coating the substrate, then removing the water.

Reinforcing or extending filler can also be added to the emulsion before or after crosslinking of the polymer. Extending fillers are used to provide opacity, color, higher specific gravity, and reduced cost.

Additional ingredients which can be added to the composition include such things as antifoam to aid during the mixing process, stabilizers such as organic amines, preferably 2-amino-2-methyl-1-propanol, and pigments such as titanium dioxide and carbon black to provide opaqueness or color to the composition.

The emulsions of this invention can be used as coatings, and when filled to give a paste consistency, as sealants and adhesives. When the emulsions of this invention are dried by removal of the water, an elastomer results. Because colloidal silica can be used as a reinforcement without problems of shelf life or useful life, excellent physical properties for the elastomer are possible, regardless of the age of the emulsion.

The following examples are included for illustrative purposes only and should not be construed as limiting the invention which is properly set forth in the appended claims.

EXAMPLE 1

To 200 g of an anionically emulsified polydimethylsiloxane emulsion having a solids content of about 70 percent by weight, the emulsion particles being less than 0.6 micrometers in average diameter and the polymer having a molecular weight average of greater than 240,000, and having a pH of 10.3, was added 0.35 g of stannous octoate (stannous bis(2-ethylhexanoate)) and the emulsion was stirred for 5 minutes. Next, 1.05 g of vinyltrimethoxysilane (VTM) was added dropwise to the emulsion with stirring. Following addition of VTM, the emulsion was stirred an additional 3 minutes, the container (one pint jar) was capped and the emulsion was allowed to remain undisturbed at room temperature for 1 hour. Following this period, the emulsion was again stirred while 5 g of 2-amino-2-methyl-1-propanol (AMP) was added dropwise. After all of the AMP was added, stirring was continued while 93 g of a 15 percent solids (by weight) sol of colloidal silica (Nalcoag (R) 1115) was slowly added to the emulsion in a thin stream. Following addition of the colloidal silica, several drops of an antifoam, Nalco 2311, were added. Stirring was stopped and a portion of the emulsion was transferred to several 2 ounce vials which were then centrifuged lightly to exclude air bubbles in the emulsion. Emulsion was poured into several 100 mm diameter Petri dishes (8 g emulsion per dish) and the dishes were left uncovered and undisturbed for 24 hours. The resulting films were elastomeric and after 1 week of aging, mechanical properties were determined: 350 psi ultimate tensile strength, 1000% ultimate elongation. The total solids content of this emulsion was approximately 50 percent by weight. It consisted of a precured emulsion containing 10 parts of silica per 100 parts of polymer (10 pph silica). In addition, it contained 0.25 pph tin (II) catalyst and 0.75 pph VTM, both based on polymer weight.

EXAMPLE 2

A series of emulsions was prepared using the same procedure as that described in example 1, except the amount of crosslinker, VTM, was changed. Elastomeric films were prepared also according to the procedure of Example 1 and their mechanical properties were determined, see Table V. Excluding the amount of VTM, composition of emulsions used to prepare elastomers in Table V was the same as the emulsion of Example 1.

TABLE V

| VTM (pph based on polymer, by wt.) | Tensile Strength | Elongation |
|---|---|---|
| 0.25 | 120 psi | 400% |
| 0.50 | 300 psi | 620% |
| 0.75 | 380 psi | 920% |

Another series of emulsions was prepared, also using the procedure described in Example 1. In this case, the crosslinker was a mixture of VTM and its partial hydrolysis products. Crosslinker consisted of approximately 50 percent VTM; the remainder was a mixture of siloxanes such as divinyltetramethoxydisiloxane, trivinylpentamethoxytrisiloxane and higher homologs up to and including the pentasiloxane. In this series, composition of the emulsions was the same as the emulsion of Example 1 except for the amount and type of crosslinker and the amount of colloidal silica. Elastomeric films from these emulsions were prepared using the procedure of Example 1 and their mechanical properties were determined. The results are summarized in Table VI.

TABLE VI

| VTM (pph) | Nalco 1115 (pph) | Tensile Strength | Elongation |
|---|---|---|---|
| 0.25 | 10 | 300 psi | 1000% |
| 0.125 | 15 | (no cure) <30 psi | <50% |
| 0.25 | 15 | 390 psi | 970% |
| 0.375 | 15 | 370 psi | 950% |
| 0.50 | 15 | 315 psi | 720% |
| 0.75 | 15 | 325 psi | 650% |

EXAMPLE 3

Following the procedure of example 1, a series of emulsions was prepared using various alkoxysilanes as crosslinker. Except for the crosslinker, emulsions in this series had the same composition as the emulsion of Example 1. Mechanical properties of elastomers derived from these emulsions are given in Table VII.

TABLE VII

| Crosslinker | Tensile Strength | Elongation |
|---|---|---|
| 2 pph A | 250 psi | 520% |
| 2 pph B | 290 psi | 620% |
| 1 pph C | 210 psi | 380% |
| 1 pph D | 300 psi | 450% |
| 0.5 pph D | 270 psi | 570% |
| 0.5 pph E | 230 psi | 470% |
| 0.75 pph E | 200 psi | 440% |
| 1.0 pph E | 200 psi | 400% |
| 2.0 pph E | 290 psi | 540% |
| 0.75 pph F | 380 psi | 920% |
| 2.0 pph G | 600 psi | 910% |

A = Si(OEt)4 (EOS)
B = —(OSi(OEt)2)— (EPS)
C = (OSiMeC2H4Si(OMe)3)4
D = (MeO)3SiC2H4Si(OMe)3
E = MeSi(OMe)3 (MTM)
F = CH2CHSi(OMe)3 (VTM)
G = Si(OC3H7)4

EXAMPLE 4

To 1 kilogram of the anionically emulsified polydimethylsiloxane emulsion of Example 1 in a one-half gallon jar was added dropwise with stirring enough 2 normal HCl to lower the pH of the emulsion to between 5 to 8. Next stirring was continued while 5.52 g of VTM was added dropwise to the emulsion. After stirring for 5 minutes, 3.5 g of stannous octoate was added dropwise to the emulsion, also with stirring. After addition of tin catalyst was complete, the emulsion was stirred for 5 minutes longer, the container was capped and the emulsion was allowed to remain undisturbed for 16 hours at room temperature. Next, the emulsion was stirred while 20 g of AMP was added dropwise. Two 100 g portions of the crosslinked emulsion polymer were transferred to smaller containers and to one of them was added, with stirring, 21 g of Nalcoag (R) 1050 colloidal silica, a 50 percent solids (by weight) sol of colloidal silica. To the other emulsion was added, also with stirring, 58.3 g of Cabosperse (R) SC-2. an aqueous, dispersed, fumed silica. These two samples consisted of emulsion polymer, 0.75 pph VTM, 0.5 pph Sn (II) catalyst and 15 pph silica. Two more emulsions were prepared that had compositions corresponding to the above described emulsions except that a Sn (IV) catalyst was used in place of the Sn (II) catalyst: To 500 g of the anionically emulsified polydimethylsiloxane emulsion of Example 1 was added dropwise with stirring, 2.63 g of VTM followed by 3.5 g of 50 percent solids by weight emulsion of dioctyltindilaurate (Sn(IV) catalyst), also with stirring. Stirring was continued while 10 g of AMP was added dropwise after which stirring was stopped, the container was closed and the emulsion was allowed to remain undisturbed for 72 hours at room temperature. Next the emulsion was divided into two 200 g portions and to one, 42 g of Nalcoag (R) 1050 colloidal silica was added with stirring and to the other, 117 g of Cabosperse (R) SC-2 aqueous, dispersed, fumed silica was added, also with stirring. These two samples consisted of emulsion polymer, 0.75 pph VTM, 0.5 pph Sn(IV) catalyst and 15 pph silica.

Elastomeric films were made from these four emulsions using the procedure described in Example 1 and their mechanical properties were determined. The emulsions were stored in closed containers and periodically, samples were removed, elastomeric films were cast and their mechanical properties were determined. The results are given in Table VIII.

TABLE VIII

| Shelf Age | Catalyst | Silica | Tensile psi | Elongation percent |
|---|---|---|---|---|
| 0 | Sn (II) | Nalco 1050 | 100 | 850 |
| 1.5 mo | Sn (II) | " | 110 | 1050 |
| 2 mo | Sn (II) | " | 105 | 1030 |
| 3 mo | Sn (II) | " | 110 | 1100 |
| 6 mo | Sn (II) | " | 110 | 1070 |
| 0 | Sn (IV) | " | 100 | 670 |
| 1.5 mo | Sn (IV) | " | 80 | 560 |
| 2 mo | Sn (IV) | " | 70 | 520 |
| 3 mo | Sn (IV) | " | 65 | 400 |
| 5 mo | Sn (IV) | " | 60 | 290 |
| 6 mo | Sn (IV) | " | 55 | 230 |
| 0 | Sn (II) | Cabot SC-2 | 190 | 600 |
| 1.5 mo | Sn (II) | " | 185 | 800 |
| 2 mo | Sn (II) | " | 185 | 810 |
| 3 mo | Sn (II) | " | 190 | 820 |
| 6 mo | Sn (II) | " | 210 | 780 |
| 0 | Sn (IV) | " | 350 | 960 |
| 1.5 mo | Sn (IV) | " | 210 | 730 |
| 2 mo | Sn (IV) | " | 200 | 730 |
| 3 mo | Sn (IV) | " | 160 | 540 |
| 5 mo | Sn (IV) | " | 145 | 420 |
| 6 mo | Sn (IV) | " | 130 | 360 |

Sn (II) = stannous octoate:
SN (IV) = dioctyltindilaurate

EXAMPLE 5

To 200 g of the anionically emulsified polydimethylsiloxane emulsion of Example 1 was added with stirring enough 2N HCl to lower pH of the emulsion to between 5 to 8. Next, stirring was continued while 1.05 of VTM was added dropwise followed immediately by the dropwise addition of 0.70 g of stannous octoate. Stirring was stopped, the container was closed and the emulsion was allowed to femain undisturbed for about 18 hours. Stirring was started and 4 g of AMP was added dropwise followed by the addition of 140 g of Nalco 1115 colloidal silica (poured into the stirred emulsion as a thin stream). This emulsion consisted of emulsion polymer, 0.5 pph Sn (II) octoate, 0.75 pph VTM and 15 pph colloidal silica.

A 20 g portion of the emulsion was transferred to a small vial and it was lightly centrifuged to exclude air bubbles. The emulsion was poured into 2 100 mm diameter plastic Petri dishes and allowed to remain uncovered and undisturbed for 1 week at ambient conditions. Mechanical properties of the resulting elastomeric film were determined. The remainder of the emulsion was stored in a closed container for 6 months at ambient conditions and at 2 months intervals, portions were removed, cast into films and mechanical properties of the resulting films were determined. Results from this shelf age study are given in Table IX.

TABLE IX

| Shelf Age | Tensile Strength | Elongation |
|---|---|---|
| 0 | 420 | 760 |
| 2 months | 400 | 780 |
| 4 months | 430 | 770 |
| 6 months | 450 | 840 |
| 10 months | 430 | 850 |

EXAMPLE 6

To 200 g of the polydimethylsiloxane emulsion of Example 1, having a pH of 8.3, was added 0.70 g of stannous octoate (stannous bis(2-ethylhexanoate)) and the emulsion was stirred for 5 minutes. Next, 1.40 g of methyltris(ethylmethylketoxime)silane (MTO) was added dropwise to the emulsion with stirring. Following addition of the MTO, the emulsion was stirred an additional 3 minutes, the container (one pint jar) was capped and the emulsion was allowed to remain undisturbed for 20 hours at room temperature. Following this period, the emulsion was again stirred while 4 g of 2-amino-2-methyl-1-propanol (AMP) was added dropwise. After all of the AMP was added, stirring was continued while 93 g of the sol of colloidal silica of Example 1 was slowly added to the emulsion in a thin stream. Following addition of the colloidal silica, several drops of an antifoam, Nalco 2311, were added. Stirring was stopped and a portion of the emulsion was transferred to several 2 ounce vials which were then centrifuged lightly to exclude air bubbles in the emulsion. Emulsion was poured into several 100 mm diameter Petri dishes (8 g emulsion per dish) and the dishes were left uncovered and undisturbed for 24 hours. The resulting films were elastomeric and after 1 week of aging, mechanical properties were determined to be: 350 psi ultimate tensile strength, and 850% ultimate elongation.

The total solids content of this emulsion was approximately 50 percent by weight. It consisted of a precured emulsion containing 10 parts of silica per 100 parts of polymer (10 pph silica). In addition, it contained 0.50 pph stannous catalyst and 2 pph MTO, both based on polymer weight.

EXAMPLE 7

This is a comparative example.

To 200 g of the polydimethylsiloxane emulsion of Example 1, having a pH of 9-10, was added, with stirring, 77.8 g of aqueous, dispersed, fumed silica (Cabot SC-2) having a solids content of 18 percent. Stirring was continued while 0.35 g of stannous octoate (stannous bis(2-ethylhexanoate)) was added and 5 minutes later, 1.05 g of vinyltrimethoxysilane (VTM) was added dropwise. Following addition of VTM, the emulsion was stirred an additional 3 minutes, the container (one pint jar) was capped and the emulsion was allowed to remain undisturbed at room temperature for 2 hours. Following this period, a small portion (10 g) of the emulsion was poured into a Petri dish and the emulsion was allowed to dry at room temperature for about 16 hours. Upon examination, the dried film was not elastomeric. It consisted of thickened polymer.

EXAMPLE 8

To 200 g of an anionically emulsified polydimethylsiloxane emulsion having a solids content of about 70 percent by weight and a pH of about 8.3, the emulsion particles being less than 0.6 micrometers in average diameter and the polymer having a molecular weight average of greater than 240,000, was added 0.70 g of stannous octoate (stannous bis(2-ethylhexanoate)) and the emulsion was stirred for 5 minutes. Next, 1.40 g of trimethylsiloxy endblocked polydiorganosiloxane having an average of five methylhydrogensiloxane units and three dimethylsiloxane units per molecule with a silicon-bonded hydrogen atom content in the range of about 0.7 to 0.8 weight percent was added dropwise to the emulsion with stirring. Following addition of the organosilicon hydride, the emulsion was stirred an additional 3 minutes, the container (one pint jar) was capped and the emulsion was allowed to remain undisturbed for 20 hours at room temperature. Hydrogen evolution was noted by a slight pressurization of the container as well as significant bubble formation in the emulsion. The emulsion was again stirred while 4 g of 2-amino-2-methyl-1-propanol (AMP) was added dropwise. After all of the AMP was added, stirring was continued while 93 g of a 15 percent solids (by weight) sol of aqueous, colloidal silica (Nalcoag (R) 1115) was slowly added to the emulsion in a thin stream. Following addition of the colloidal silica, several drops of an antifoam, Nalco 2311, were added. Stirring was stopped and a portion of the emulsion was transferred to several 2 ounce vials which were then centrifuged lightly to remove bubbles from the emulsion. Emulsion was poured into several 100 mm diameter Petri dishes (8 g emulsion per dish) and the dishes were left uncovered and undisturbed for 24 hours. The resulting films were elastomeric and after 1 week of aging at ambient conditions, mechanical properties were determined to be 160 pounds per square inch ultimate tensile strength and 480 percent ultimate elongation. The total solids content of this emulsion was approximately 50 percent by weight. It consisted of a precured emulsion containing 10 parts of silica per 100 parts of polymer (10 pph silica). In addition, it contained 0.50 pph stannous catalyst and 1 pph organosilicon hydride crosslinker, both based on polymer weight.

EXAMPLE 9

This is a comparative example,

To 200 g of the emulsion of Example 11 was added 0.70 g of stannous octoate (stannous bis(2-ethylhexanoate)) and the emulsion was stirred for 5 minutes. Next, 1.40 g of 3-(2-aminoethylamino)propyltrimethoxysilane was added dropwise to the emulsion with stirring. Following addition of the aminofunctional silane, the emulsion was stirred an additional 3 minutes, the container (one pint jar) was capped and the emulsion was allowed to remain undisturbed for 20 hours at room temperature. A portion of the emulsion was transferred to a small vial and the vial was centrifuged lightly to remove air bubbles from the emulsion. 10 g of emulsion was poured into a 100 mm diameter Petri dish the dish was left uncovered and undisturbed for 24 hours. The resulting film was not elastomeric, indicating that the emulsion polymer had not been crosslinked. The same experiment was repeated except that 2.8 g of the aminofunctional silane was used. The dried film from this experiment was only very slightly elastomeric and it was extremely tacky. Nalco 1115 colloidal silica was added to this emulsion so as to give an emulsion having 10 parts by weight of (dry) silica per 100 parts of polymer. A film cast from this emulsion and dried for 20 hours was not elastomeric.

The same results were obtained when the experiment was repeated using 4.2 g of the aminofunctional silane as crosslinker. The same results were obtained when 1.4 g of aminopropyltriethoxysilane was used as a crosslinker.

EXAMPLE 10

A mixture was prepared by stirring for 2 hours in a 2 liter beaker 450 g of a hydroxyl endblocked polydimethylsiloxane having a viscosity of about 12 Pa.s at 25° C. and about 10 percent of the endblockers being trimethylsiloxy, 50 g of nonionic surfactant (Tergitol (R) TMN-6, and 500 g of water. The mixture was emulsified by passing through a Gaulin laboratory homogenizer for 3 passes at 7500 psi. The resulting emulsion consisted of approximately 45 percent by weight silicone oil in water nonionic emulsion.

A 30 g portion of the above emulsion was weighed into a vial and 0.07 g of stannous octoate and 1.35 g of vinyltrimethoxy was added. The vial was capped and it was shaken for 30 minutes using a laboratory wrist type shaker. The emulsion was allowed to stand undisturbed at room temperature for about 18 hours after which approximately 10 g of the product was poured into a Petri dish. After the emulsion had dried for 24 hours, the resulting film was inspected and found to be an elastomer.

EXAMPLE 11

To 70 g of an anionically emulsified polydimethylsiloxane emulsion having a solids content of 70 percent by weight, a pH near 7.0, and emulsion particles being less than 1 micrometer in average diameter, the polydimethylsiloxane having a molecular weight of 75,000 and endcapped with trimethoxysilylethylene [(CH$_3$O)$_3$SiCH$_2$CH$_2$—], was added 0.36 g of stannous octoate (stannous bis(2-ethylhexanoate)) and the emulsion was mixed for 1 minute. The emulsion was cast into a thin film which was allowed to dry at ambient conditions for 48 hours. The resulting film was elastomeric.

EXAMPLE 12

A sample of a cationically stabilized silicone emulsion was obtained and used in this experiment. The emulsion was 35 percent by weight silicone solids and was stabilized using a cationic emulsion (Arquad T27W).

Ten grams of the silicone emulsion was weighed into a one ounce vial and 0.038 g of stannous octoate, tin II, (Fascat 2003) was added to the emulsion. After mixing, 0.038 g of trifluoropropyltrimethoxysilane was added and the entire mixture was mixed until homogeneous. The concentrations of tin catalyst and alkoxy silane crosslinker added to the emulsion was equal to 1 part per hundred parts of silicone solids in the emulsion. After a 10 minute gestation time, a sample (5 g) of the emulsion was cast into a 3½ inch plastic Petri dish. The following morning the evaporated film was cured, stretchy and elastomeric.

EXAMPLE 13

An experiment was run to demonstrate use of tin II catalyst at varying emulsion pHs.

An anionically stabilized emulsion polymer (65.6 percent solids) at a pH of 7.19 was used in this experiment. The pH of samples of the emulsion was adjusted with 2N NaOH or 1N HCl to give a final pH of 10.94 or 2.2, also included was the pH of 7.19. To 100 g of each sample of the emulsion was added 0.32 g (0.5 pph) of stannous octoate (Fascat 2003) and 0.65 g (1.0 pph) of vinyltrimethoxysilane. After 16 hours of gestation time, 2.89 g (5 pph) of Nalco 1140 colloidal silica was added to each sample for reinforcement. Films of each sample were cast 1 hour after adding the silica in 3½ inch plastic Petri dishes. After 3 days cure, measurements of physical properties, swell, gel and clarity evaluations of each film were made with the results shown in the following Table. The results show that all systems cured to excellent elastomeric films.

TABLE

| pH, original | 7.19 | | 7.19 | | 7.19 | |
|---|---|---|---|---|---|---|
| adjust | no | | NaOH | | HCl | |
| pH | 7.19 | | 10.94 | | 2.2 | |
| After addition of Vinyltrimethoxysilane | 0.5 pph | | Tin II | and | 1.0 pph | |
| pH | 4.61 | | 5.16 | | 3.86 | |
| Tensile, psi | 36.8 | | 45.6 | | 51.2 | |
| Elongation, percent | 238 | | 337 | | 747 | |
| pH | 4.61 | 4.61 | 5.16 | 5.16 | 3.86 | 3.86 |
| adjust | no | yes | no | yes | no | yes |
| pH | 4.61 | 11.11 | 5.16 | 11.21 | 3.86 | 10.72 |
| After addition of 5 pph of Nalco 1140 colloidal silica | | | | | | |
| pH | 6.48 | 10.29 | 6.66 | 11.03 | 6.47 | 10.58 |
| Tensile, psi | 103 | 87.5 | 87.3 | 59.6 | 102.6 | 89.2 |
| Elongation, percent | 453 | 303 | 265 | 213 | 540 | 579 |

That which is claimed is:

1. An aqueous silicone emulsion stabilized cationically or nonionically or by a combination of both which yields an elastomer upon removal of the water comprising (1) 100 parts by weight of cationically or nonionically stabilized polydiorganosiloxane emulsion, the polydiorganosiloxane having at least two reactive groups per molecule, the organo radicals being monovalent hydrocarbon radicals containing less than 7 carbon atoms per radical or 2-(perfluoroalkyl)ethyl radicals having less than 7 carbon atoms per radical, the reactive groups selected from the atoms or radicals consisting of (a) hydrogen, (b) OR, where R is hydrogen, monovalent hydrocarbon radical or substituted hydrocarbon radical having less than 7 carbon atoms, functionalized hydrocarbon radicals, nitrogen compounds of the formula $-N=CR'_2$ or $-NR'COR'$ or $-NR'_2$, where R' is either hydrogen or monovalent hydrocarbon radicals having less than 7 carbon atoms, (c) groups of the formula $-NR_2$ or $-NCOR$, where R is as defined above, and (d) halogen, (2) from 0.1 to 10 parts by weight of tin (II) catalyst, and, when (1) has only 2 reactive groups per molecule, (3) sufficient crosslinker on a stoichiometric basis selected from the group consisting of (e) silane of the formula $R_xSiY_{4-x}$ where Y is selected from the group consisting of hydrogen, halogen, and OR', and R and R' are as defined above, and x is either 0 or 1; and (f) silazane of the formula $R_xSi(NR'_2)_{4-x}$, where R, R' and x are as defined above;

the emulsion being able to be filled with either reinforcing or extending fillers or pigments or combinations thereof, the emulsion yielding an elastomer upon evaporation of the water.

2. The emulsion of claim 1 in which (1) has 2 reactive groups per molecule and (3) is present.

3. The emulsion of claim 1 in which there is also present a filler.

4. The emulsion of claim 3 in which the filler is colloidal silica.

5. The emulsion of claim 1 in which the reactive groups of (1) are (a) hydrogen.

6. The emulsion of claim 1 in which the reactive groups of (1) are (b) OR, where R is hydrogen, monovalent hydrocarbon radical or substituted hydrocarbon radical having less than 7 carbon atoms, functionalized hydrocarbon radicals, nitrogen compounds of the formula $-N=CR'$ or $-NR'COR'$ or $-NR'_2$, where R' is either hydrogen or monovalent hydrocarbon radicals having less than 7 carbon atoms.

7. The emulsion of claim 6 in which the reactive groups of (1) are of the formula $-NR'COR'$.

8. The emulsion of claim 1 in which the reactive groups of (1) are (c) groups of the formula $-NR_2$ or $-NCOR$ where R is hydrogen, monovalent hydrocarbon radical or substituted hydrocarbon radical having less than 7 carbon atoms, functionalized hydrocarbon radicals, nitrogen compounds of the formula $-N=CR'_2$ or $-NR'COR'$ or $-NR'_2$, where R' is either hydrogen or monovalent hydrocarbon radicals having less than 7 carbon atoms.

9. The emulsion of claim 1 in which the reactive groups of (1) are (d) halogen.

10. The emulsion of claim 1 in which the crosslinker (3) is (e) silane of the formula $R_xSiY_{4-x}$ where Y is selected from the group consisting of hydrogen, halogen, and OR', and R, R' and x are as defined above.

11. The emulsion of claim 1 in which the crosslinker (3) is (f) silazane of the formula $R_xSi(NR'_2)_{4-x}$, where where R is hydrogen, monovalent hydrocarbon radical or substituted hydrocarbon radical having less than 7 carbon atoms, functionalized hydrocarbon radicals, nitrogen compounds of the formula $-N=CR'_2$ or $-NR'COR'$ or $-NR'_2$, where R' is either hydrogen or monovalent hydrocarbon radicals having less than 7 carbon atoms, and x is either 0 or 1.

12. The emulsion of claim 11 in which R is of the formula —NR'COR'.

13. The emulsion of claim 1 in which (1) is a mixture of molecules in which some molecules are polydiorganosiloxanes having 2 reactive groups and the remainder of the molecules are polydiorganosiloxanes in which there are 3 or more reactive groups, the crosslinker (3) being an optional ingredient.

14. An aqueous silicone emulsion stabilized cationically or nonionically or by a combination of both which yields an elastomer upon removal of the water comprising the product obtained by (A) mixing (1) 100 parts by weight of cationically or nonionically stabilized polydiorganosiloxane emulsion, the polydiorganosiloxane having at least two reactive groups per molecule, the organo radicals being monovalent hydrocarbon radicals containing less than 7 carbon atoms per radical or 2-(perfluoroalkyl)ethyl radicals having less than 7 carbon atoms per radical, the reactive groups selected from the atoms or radicals consisting of (a) hydrogen, (b) OR, where R is hydrogen, monovalent hydrocarbon radical or substituted hydrocarbon radical having less than 7 carbon atoms, functionalized hydrocarbon radicals, nitrogen compounds of the formula —N=CR'$_2$ or —NR'COR' or —NR'$_2$, where R' is either hydrogen or monovalent hydrocarbon radicals having less than 7 carbon atoms, (c) groups of the formula —NR$_2$ or —NCOR, where R is as defined above, and (d) halogen, (2) from 0.1 to 10 parts by weight of tin (II) catalyst, and when (1) has only 2 reactive groups per molecule, (3) sufficient crosslinker on a stoichiometric basis selected from the group consisting of (e) silane of the formula $R_xSiY_{4-x}$ where Y is selected from the group consisting of hydrogen, halogen, and OR', and R and R' are as defined above, and x is either 0 or 1; and (f) silazane of the formula $R_xSi(NR'_2)_{4-x}$, where R, R' and x are as defined above; then (B) aging at room temperature for sufficient time to allow crosslinking of the polydiorganosiloxane, the emulsion being able to be filled with either reinforcing or extending fillers or pigments or combinations thereof, the emulsion yielding an elastomer upon evaporation of the water.

15. A process for producing an aqueous silicone emulsion stabilized cationically or nonionically or by a combination of both which yields an elastomer upon removal of the water comprising (A) mixing (1) 100 parts by weight of cationically or nonionically stabilized polydiorganosiloxane emulsion, the polydiorganosiloxane having at least two reactive groups per molecule, the organo radicals being monovalent hydrocarbon radicals containing less than 7 carbon atoms per radical or 2-(perfluoroalkyl)ethyl radicals having less than 7 carbon atoms per radical, the reactive groups selected from the atoms or radicals consisting of (a) hydrogen, (b) OR, where R is hydrogen, monovalent hydrocarbon radical or substituted hydrocarbon radical having less than 7 carbon atoms, functionalized hydrocarbon radicals, nitrogen compounds of the formula —N=CR'$_2$ or —NR'COR' or —NR'$_2$, where R' is either hydrogen or monovalent hydrocarbon radicals having less than 7 carbon atoms, (c) groups of the formula —NR$_2$ or —NCOR, where R is as defined above, and (d) halogen, (2) from 0.1 to 10 parts by weight of tin (II) catalyst, and when (1) has only 2 reactive groups per molecule, (3) sufficient crosslinker on a stoichiometric basis selected from the group consisting of (e) silane of the formula $R_xSiY_{4-x}$ where Y is selected from the group consisting of hydrogen, halogen, and OR', and R and R' are as defined above, and x is either 0 or 1; and (f) silazane of the formula $R_xSi(NR'_2)_{4-x}$, where R, R' and x are as defined above; then (B) aging at room temperature for sufficient time to allow crosslinking of the polydiorganosiloxane, to give an emulsion being able to be filled with either reinforcing or extending fillers or pigments or combinations thereof, the emulsion yielding an elastomer upon evaporation of the water.

16. The method of claim 15 in which (1) is emulsified, then (2) is added to the emulsion.

17. The method of claim 15 in which (1) and (2) are mixed and then emulsified.

18. The method of claim 15 in which (1) is emulsified, then (2) and (3) are added to the emulsion.

19. The method of claim 15 in which (1) and (2) are mixed together, emulsified, and then (3) is added.

20. The method of claim 15 in which (1) and (3) are mixed together, emulsified, and then (2) is added.

21. The method of claim 15 in which filler is added to the emulsion (1) before the addition of (2) or (3).

22. The method of claim 16 in which a reinforcing or extending filler is added to (1) before emulsification, the filler being one which does not adversely react in the emulsion.

23. The method of claim 17 in which a reinforcing or extending filler is added to the mixture of (1) and (2) before emulsification, the filler being one which does not adversely react in the emulsion.

24. The method of claim 20 in which a reinforcing or extending filler is added to the mixture of (1) and (3) before emulsification, the filler being one which does not adversely react in the emulsion.

* * * * *